April 16, 1968  J. J. BLUMENKRANZ  3,378,672
INSULATED, ELECTRICAL RESISTANCE WIRE AND WELDING
SLEEVE MADE THEREFROM
Filed March 18, 1966  2 Sheets-Sheet 1

INVENTOR
JAMES J. BLUMENKRANZ
BY
ATTORNEY

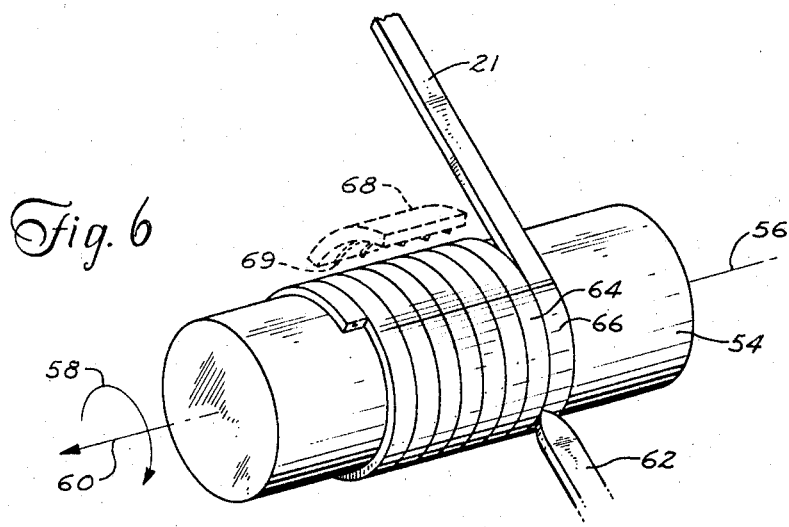
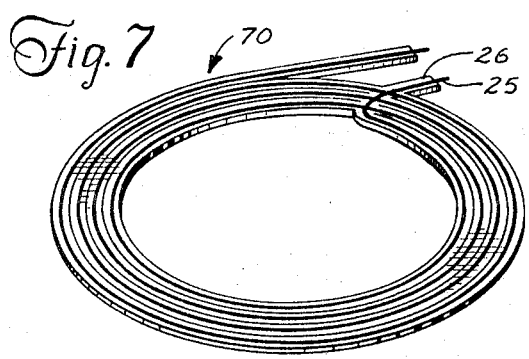
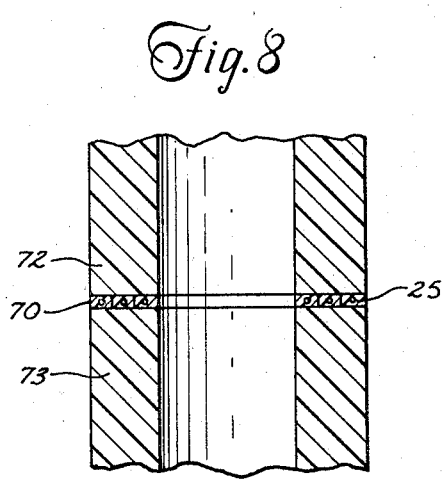
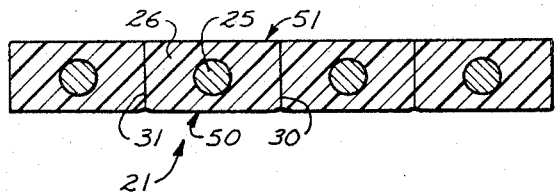

United States Patent Office 3,378,672
Patented Apr. 16, 1968

3,378,672
INSULATED, ELECTRICAL RESISTANCE WIRE
AND WELDING SLEEVE MADE THEREFROM
James J. Blumenkranz, Hollywood, Calif., assignor to The
Susquehanna Corporation, a corporation of Delaware
Filed Mar. 18, 1966, Ser. No. 535,555
8 Claims. (Cl. 219—200)

ABSTRACT OF THE DISCLOSURE

An improved welding sleeve comprising a plurality of turns of insulated, electrical resistance wire that are joined together. The insulated resistance wire is embedded throughout its length in a sheath of thermoplastic material having a rectangular cross section wherein one pair of opposed sides is substantially longer than the second pair of opposed sides. The welding sleeve is formed by fusing together, throughout their length, helically wound abutting turns of the insulated resistance wire to provide a unitary coil. In one embodiment, the wire is oriented with the elongated opposed sides of the sheath parallel to the direction in which the coil turns are serially aligned. The resistance wire is coated with an insulator prior to being embedded in the sheath, the insulator being adapted to retain its integrity as an insulation coating at the temperature at which the sheath fuses.

---

Figure 1:
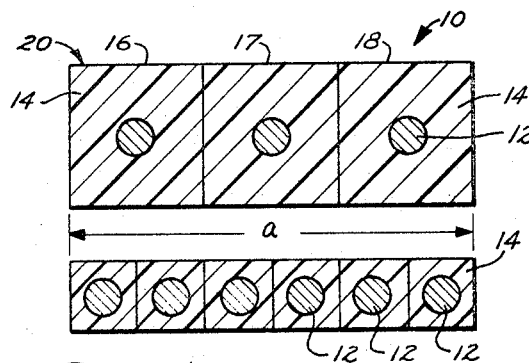

This invention relates to insulated, electrically conductive wire and heating products made therefrom. More particularly, this invention relates to insulated electrical resistance wire and welding sleeves made from such wire, the sleeves being particularly adapted for joining sections of thermoplastic material by thermal welding.

Electrical resistance heating sleeves are well known and can be used for a myriad of applications. Some examples of uses for such heating sleeves are heating tubular articles such as pipes or containers, or for welding thermoplastic articles such as pipes and pipe fittings. One method of forming such a sleeve is to helically wrap a coil and bond together adjacent turns of the coil such as is illustrated in U.S. Patent No. 3,062,940. The quantum of heat generated by these coils depends largely upon the total amount of resistance element present, the thickness of the electrical insulation (which also serves as thermal insulation) and the number of coil turns per unit length of sleeve. When it is desired to use such a sleeve as a welding sleeve for joining plastic pipe to fittings, the pipe and fitting define an annulus of minimal radial dimension in which the welding sleeve is mounted. Because of space limitations and to promote welding efficiency by increasing the ease of heat transfer to the sleeve surface, the thickness of welding sleeve insulation in the radial direction must be minimized while maintaining the number of turns and quantity of element used per unit length of sleeve at the desired level. This flexibility of design is unavailable with prior art insulated electrical resistance wire.

Conventionally insulated wires used in the making of such coils have either square or circular cross sections such that the distance from the resistance wire or element to the outside surface of the insulator covering or sheath is substantially equal in directions along perpendicular axes passing through the center of the sides of the sheath. For a given length and diameter of coil, the number of turns and the displacement between adjacent resistance elements are dependent upon the cross sectional dimension of the sheath. With the conventional cross sectional shapes referred to above, i.e., the square and circular shapes, a decrease in sheath thickness to locate the resistance closer to the surface and minimize the thermal insulation in order to improve the heater's efficiency, will decrease the space between adjacent resistance elements, increase the number of turns per unit length of coil, and incrase the total amount of resistance element present. Flexibility of sleeve design is unavailable because a change in insulation thickness affects other factors which are important criteria in heater sleeve design.

Thermoplastics have become increasingly important as materials for constructing many types of articles, primary examples of which are pipes and pipe fittings. The ability to withstand corrosion, the ease of handling, the minimum weight, and the moldability of such materials, make them extremely attractive for such use. Joining thermoplastic articles has been accomplished by conventional mechanical joining means such as threaded joints and flange connections, by chemical means such as solvent welding, and by thermal means, such as heat welding. In many applications mechanical joints are unacceptable due to their tendency not to be fluid-tight and because such assembly is time-consuming, expensive, and cumbersome. Solvent welding requires some degree of care in applying the solvent to the surfaces of the articles to be joined and also requires the immediate assembly of these articles since the solvent attacks the thermoplastic material immediately. In order to provide a proper joint the parts must be immediately assembled after application of the solvent. Some thermoplastic materials, for example, polypropylene, resist conventional solvents used for welding and, therefore, to date, have been joined primarily by mechanical joining means or by thermal welding. One of the methods used for thermal welding such articles has involved the use of a welding sleeve of the type described in U.S. Patents 3,094,452 and 2,739,829. In such sleeves, an electrical resistance element is embedded in a thermoplastic sheath which is placed contiguous to the surfaces to be joined. Electric current is caused to pass through the element either inductively or conductively and the resultant heat effects fusing of the thermoplastic material. Since thermoplastic materials are poor heat conductors, it is desirable to maintain the thickness of thermoplastic material between the resistance element and the surface to be fused at a minimum, thereby improving the efficiency of the welding sleeve. Furthermore, because the quantum of heat energy released is directly proportional to the amount of resistance element present, it is extremely important to provide a sufficient length of resistance element over the juncture area to generate the required heat for fusing the articles to be joined.

Accordingly, it is one object of this invention to provide an improved, insulated, electrical resistance wire which permits greater flexibility in heater coil design.

It is another object of this invention to provide an improved insulated, electrical resistance wire which permits the formation of an integral coil having joined adjacent turns and which permits increase of coil length while maintaining constant the coil width and the number of coil turns.

A further object of this invention is to provide an improved insulated electrical resistance wire which permits fusing together adjacent turns of a coil to form a sleeve having minimum insulation between the resistance wire and the sleeve surface without injuring the insulation.

A further object of this invention is to provide an improved coil for use as a welding sleeve for joining sections of thermoplastic material which sleeve is integral and self-supporting and of desired length and content of resistance element and which locates the resistance wire as close to the surface of the sleeve as is desirable.

It is still a further object of this invention to provide an improved coil for use as a welding sleeve which is easy and inexpensive to manufacture and can be produced as a production-run item.

Figure 2:
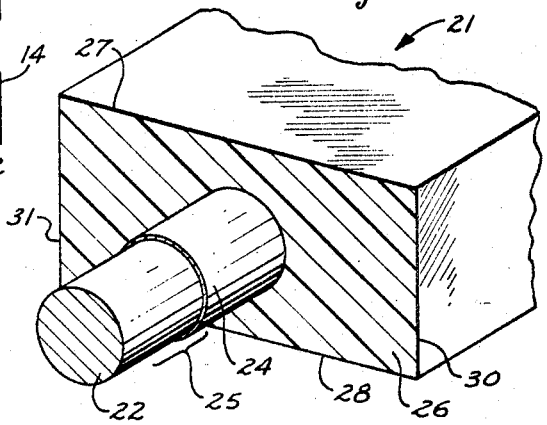
Figure 3:
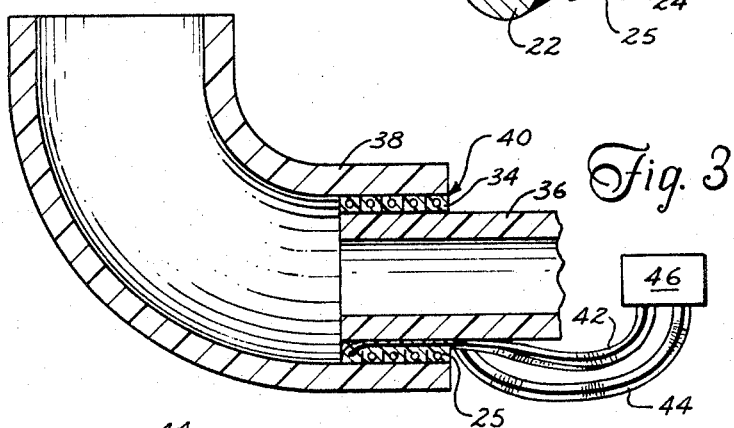
Figure 4:
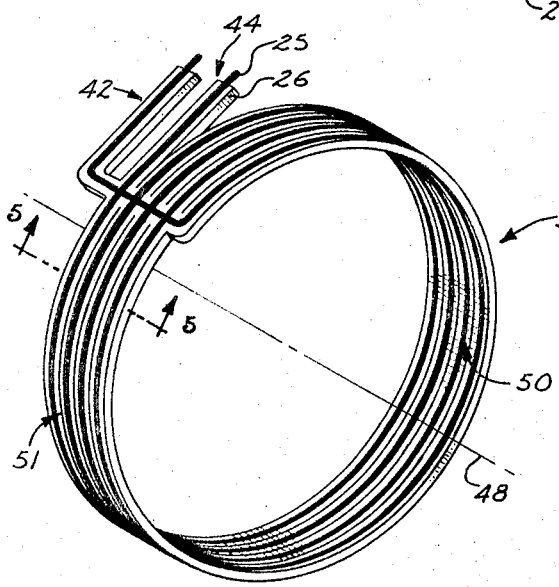

Further objects and attendant advantages of the present invention will become better understood from the below description and the accompanying drawings, in which:

FIGURE 1 illustrates two examples of prior art insulated wires having sheaths of different widths forming two coils of equal length, FIGURE 2 is a sectioned perspective view of an insulated electrical resistance wire formed in accordance with this invention, FIGURE 3 is a sectional view of a pipe and pipe fitting assembled to be joined together by a welding sleeve formed in accordance with one embodiment of this invention, FIGURE 4 is a perspective view of a cylindrical welding sleeve formed in accordance with one embodiment of this invention, FIGURE 5 is a view taken along line 5—5 of FIGURE 4, FIGURE 6 is a schematic illustration of a method of making the welding sleeve of FIGURE 4, FIGURE 7 is a perspective view of a pancake welding sleeve formed in accordance with another embodiment of this invention, and FIGURE 8 is a sectional view of two axially aligned pipes joined together by means of the welding sleeve illustrated in FIGURE 7.

Briefly stated, this invention, in one form, teaches an improved, insulated electrical resistance wire which is contemplated for use in forming an integral, self-sustaining heater coil or sleeve. The insulated resistance wire includes a thermoplastic sheath having a rectangular cross section in which one pair of opposed sides is substantially longer than the other pair of opposed sides. Embedded within the sheath is an electrical resistance element coated with a thin coating of enamel insulator. The enamel is so chosen as to be able to withstand, without deterioration, the temperature at which the sheath fuses.

The invention also includes a coil manufactured from the above-described wire and which is intended for use as a sleeve for welding contiguous articles, such as pipe and pipe fittings of thermoplastic material. The sleeve comprises a coil having a plurality of turns of the insulated electrical resistance wire, the adjacent turns being fused together to provide a self-sustaining sleeve. In forming the coil, the wire is oriented with the elongated sides of the sheath parallel to the direction in which the coil turns are serially aligned, with adjacent turns abutting against each other and being continuously fused together by application of sufficient heat. Due to the rectangular shape of the sheath, the resistance element can be located as close to the sleeve surface as is desirable to permit effective and efficient heat generation for fusing the thermoplastic articles intended to be joined while still providing sufficient thermoplastic material between the element and the side of the sheath which will abut against the adjacent coil turn to allow for fusing together of adjacent turns.

The shape of the sheath also promotes efficient fabrication of the coil by permitting continuous fusing of adjacent turns simultaneously with the winding of the coil without damaging the sleeve or baring the element in spite of the minimal dimension between the resistance element and the surface of the sleeve. The enamel insulation coating prevents shorting of the coil in the event adjacent turns contact each other when the sheath is in a fused state and the wires expand due to thermal expansion. Furthermore, the sheath shape facilitates handling of the wire as it negates the tendency of the wire to rotate or twist as it is being coiled.

Adverting now to the drawings, and more particularly to FIGURE 1, there is illustrated an example of conventionally insulated electrically conductive wire 10 which includes a round conductor 12 and a square sheath of insulating material 14. FIGURE 1 clearly illustrates that with such wire, for a unit length ($a$) of coil, wherein adjacent turns 16, 17, 18 are joined together and for a fixed conductor diameter, the number of turns is largely dependent upon the insulator sheath thickness. When the coil is used as a heating element, such as a welding sleeve, it is desirable to minimize the sheath thickness between the conductor 12 and the sleeve surface 20 in order to promote rapid and efficient heat transfer. FIGURE 1 illustrates the results of such a reduction in sheath thickness with conventional, or prior art, wire. Reducing the thickness of insulator sheath 14 materially increases the number of coil turns per unit coil length ($a$), decreases the spacing between adjacent conductors 12, and increases the total volume of conductor present per unit length. Each of these variations results in increasing the heat generated per unit coil length ($a$) and could result in damaging the item being heated. Furthermore, it is uneconomical to employ excessive wire.

While FIGURE 1 illustrates a sheath 14 having a square cross section, it is clear that similar problems arise with conventional wiring utilizing a sheath having a circular cross section (not shown).

The present invention teaches a sheathed insulated wire 21, illustrated in FIGURE 2, which utilizes an electrical conductor or resistance element 22, illustrated as round wire; however, square wire is also contemplated. The element 22 is insulated with a thin enamel coating 24 which may be any conventional insulation enamel which has a high dielectric strength. The insulated, or coated, element 25 is then embedded in a sheath 26 of thermoplastic polymer such as by extruding the thermoplastic material about the element 25. The sheath 26 is formed with a rectangular cross section having a first pair of opposed sides 27, 28 of enlarged dimension as compared with the second pair of opposed sides 30, 31. Such a configuration provides an increased thickness of material between the insulated element 25 and the second pair of opposed sides 30, 31 as compared with the distance between the element 25 and the first pair of opposed sides 27, 28.

One specific use for such a wire 21 is in the fabrication of a coil or welding sleeve 34 (FIGURES 3 and 4) which is used for fusing together plastic pipes and fittings. For purposes of clarity and illustration, the sheath 26 is illustrated as being transparent in order to show the resistance element 25. In order to clearly understand the welding sleeve design criteria and the use of the sleeve 34, a description of how the sleeve is used will be undertaken before details of the sleeve design are entered into. FIGURE 3 schematically illustrates a plastic pipe 36 being joined to a plastic pipe fitting or elbow 38. Interposed in the annulus 40 defined by the pipe 36 and fitting 38 is the welding sleeve 34 formed in accordance with this invention. Two electric leads 42, 44 extend from the welding sleeve 34 and are connected to an electrical energy source 46, such as a battery. Energization of the sleeve 34 effects heat generation of sufficient magnitude to fuse the thermoplastic sheath 26, and the surfaces of the pipe 36 and fitting 38 which are contiguous to the sleeve 34, resulting in a firmly bonded welded joint. It is quite clear that the primary considerations in designing the sleeve 34 are minimum sleeve wall thickness, minimum distance between the resistance element 22 and the surfaces to be bonded, adequate sleeve length to provide a sufficiently strong joint, and appropriate number of turns or length of wire per unit length of sleeve to provide a quantum of heat within a range sufficient to fuse the adjoining surfaces and yet not to exceed an amount which would effect fusing of the pipes and fittings throughout their cross section or which would otherwise damage them. As used throughout this description and in the appended claims, sleeve or coil wall thickness is defined as the radial width of the sheath 26 or, in other words, the sleeve outside radius minus the sleeve inside radius. With these factors in mind, the discussion now turns to a detailed description of the welding sleeve 34 as illustrated in FIGURES 4 and 5.

Since the sleeve 34 is to be used as a heat source the electrical conductor 22 is chosen to be an electrical resistance element such as iron wire. As described above, the primary use intended for the sleeve 34 of this invention is to effect a welded plastic pipe joint. Accordingly, the sheath 26 preferably is formed from the same material from which the plastic pipe 36 and fitting 38 are formed. While many thermoplastic polymers can be used, most plastic pipe is made of thermoplastic aliphatic hydrocarbon polymers, which fuse at temperatures in the range of 350° F. to 550° F. Polypropylene, which fuses at 350° F., is a particularly suitable material to join by thermal welding since it is chemically resistant to commercial solvents used for solvent welding. The enamel insulation coating is appropriately chosen to be able to withstand the fusing temperature of the sheath 26 while maintaining its integrity as an insulation coating. Thus, the insulation coating should comprise a material that retains its integrity by having a softening temperature above that of the sheath and does no decompose at the sheat-fusing temperature. Such enamels can be inorganic ceramics, organic resins of the thermosetting type or thermoplastic resins. An example of such an enamel is polytetrafluoroethylene which can withstand temperatures up to 600° F. to 650° F. without showing signs of deterioration.

The sheathed wire 21 is oriented such that the first pair of opposed sides 27, 28 are parallel to the direction in which adjacent turns of the sleeve are added or, in other words, in the case of the cylindrical sleeve illustrated in FIGURE 4, the first pair of opposed sides 27, 28 are parallel to the sleeve axis 48. By so orienting the wire 21 the distance from the resistance element 22 to the inner and outer surfaces 50, 51, respectively, of the sleeve 34, is kept to a minimum. The sheathed wire 21 is wound that each side 30, 31 of the second pair of opposed sides of each turn abuts against a similar side of the turn immediately contiguous thereto (see FIGURE 5) thereby forming a sleeve having a relatively smooth inner and outer surface 50, 51, respectively. In joining pipes and fittings it is necessary to have smooth contacting surfaces in order to provide fluid-tight joints and joints that will remain bonded under extreme conditions. Sleeves not having smoothness of surface as is provided by the sleeve of this invention will form air pockets which result in unacceptable joints. Applying heat to the sleeve's outer surface 51 of sufficient intensity to effect fusing of the sheath 26 results in an integral, self-sustaining sleeve 34.

FIGURE 6 illustrates one method for continuously fusing together adjacent turns of the sleeve 34 simultaneously with the winding of the turns. The sheathed wire 21 is continuously fed from a roll (not shown) onto a mandrel 54 which simultaneously rotates about and translates along its axis 56 (as shown by arrows 58, 60, respectively) in order to provide a helical winding. A heating element, such as a pointed electrode 62, is located immediately adjacent the juncture of two adjacent turns 64, 66. Due to the significant amount of thermoplastic sheath material available at the juncture of the two turns, the fusing of them together without baring or otherwise damaging the insulated resistance element 25 is simplified considerably. If desired, in place of the pointed electrode 62, a heating shoe 68 (illustrated in phantom lines), having pointed projections 69 spaced apart the width of the sheath 26, can be employed, the projections contacting the juncture of several turns simultaneously heating them and applying slight pressure to effect the fusing together of adjacent turns. As the mandrel 54 translates along its axis 56 those turns which have been fused together translate beyond the heating shoe 68 and cool to form an integral self-sustaining sleeve 34. After completion of the fusing and cooling process steps, the sleeve is removed from the mandrel 54. If desired, a plurality of sleeves can be manufactured in series by merely ceasing the heating and fusing operation during the winding of several turns and then continuing the heating and fusing operation. Such a process will result in a series of integral self-sustaining sleeves separated and joined by a plurality of loose, unfused turns which, after removal from the mandrel 54, are cut to provide independent sleeves 34.

When the sleeve 34 is used as a welding sleeve for joining plastic pipes and fittings, it is necessary that both electric leads 42, 44 extend from the same end of the sleeve 34, as shown in FIGURE 3. To achieve this, prior art sleeves employ bifilar wire wherein the wires on one end of the sleeve are electrically connected providing a single current flow path through the sleeve terminating with two leads at one end thereof. The enamel insulated resistance element 25 embedded in the sheath 26, as taught in the instant invention, eliminates the need for bifilar wire for this purpose. After the sleeve 34 is formed, one of the leads, for example, lead 42 (FIGURE 4) is crossed over the sleeve 34 and a heating shoe (not shown) fuses the lead 42 to the sleeve providing a smooth exterior surface 51. The insulated element 25 in the lead 42 is spaced slightly from the insulated elements 25 in the individual turns as can be seen in FIGURE 3. Even if the elements were to contact each other, such as when the welding process is occurring and the sleeve 34 is in a fused state, the enamel insulation 24 will prevent shorting out of the sleeve 34.

While the above discussion pertains to a cylindrical sleeve 34 for use in an annulus 40, it is also clear that this invention contemplates formation of a coil 70 which comprises a flat, planar, either elliptical, circular, or rectangular winding, often referred to as a pancake winding, and which is illustrated in FIGURE 7. Such a coil 70 can be used to form a butt joint of two plastic pipes 72, 73 of equal diameter, as illustrated in FIGURE 8. When forming a planar coil 70, the sheathed wire 21 is oriented such that the first or longer pair of opposed sides 27, 28 are aligned parallel to the direction in which adjacent turns are added or, in other words, along the radius or width of the coil 70. This permits accurate control and minimization of the coil's axial thickness for the same beneficial reasons as are discussed above.

It should be noted that the embodiment of this invention pertaining to the method of manufacturing the coil is not limited to the processes described above and illustrated in FIGURE 6. For example, it is also contemplated that the mandrel 54 can be used as a heat source resulting in the fusing together of the adjacent turns along the internal surface 50 of the coil.

It is quite clear, from the above description, that an insulated electrical resistance element 22 coated with an insulating enamel 24 and having a rectangular sheath 26, as illustrated in FIGURE 2, provides many advantages over state-of-the-art sheathed wires. Such a configuration provides significant flexibility in a design of coils or sleeves to permit fabrication of a sleeve of desired length, diameter, number of turns, and thickness to a degree previously unattainable. This is particularly advantageous in applications of the coil as a welding sleeve where it is very beneficial to maintain the distance between the insulated resistance element 25 and the exterior and interior surfaces of the sheath 26 at a minimum in order to obtain efficient heat transfer to the desired surfaces and yet be able to space adjacent turns of the resistance element as desired and to control the amount of element located within in the necessary length of sleeve required. Since the amount of heat generated is directly proportional to the amount of element present, in many applications it is essential to limit the amount of heat generated so as not to overheat the target of the heat source. This is easily controlled in the instant invention by merely increasing or decreasing the length of the first pair of opposed sides 27, 28 of the sheath 26 while maintaining the length of the second pair of opposed sides 30, 32 at a minimum. The invention also provides for cross-over of the electrical leads to provide a sleeve having both leads extending from one end of the sleeve.

While several specific embodiments have been shown and described above, it will be obvious to those skilled in the art that various changes and modifications may be made without departing from the invention in its broader aspects. Therefore, it is intended in the appended claims to cover all such changes and modifications as fall within the true spirit and scope of this invention.

What is claimed as new and desired to be secured by Letters Patent of the United States is:

1. A welding sleeve, comprising:

a plurality of turns of insulated, electrical resistance wire, said wire comprising a sheath of thermoplastic material of indefinite length having a cross section wherein a first pair of opposed sides is substantially longer than a second pair of opposed sides, and an electrical resistance element embedded in said sheath throughout its length such that the distance from said element to said first pair of opposed sides is substantially less than the distance from said element to said second pair of opposed sides;

said wire being oriented with said first pair of opposed sides parallel to the direction along which said turns are serially added, each side of said second pair of opposed sides of each turn abutting against and being fused throughout its length to one side of said second pair of opposed sides of the turn contiguous thereto to provide an integral, self-sustaining sleeve.

2. The sleeve as defined in claim 1 wherein said sheath has a rectangular cross section.

3. The sleeve as defined in claim 2 wherein said resistance element is coated with an insulator prior to being embedded in said sheath, said sheath being adapted to fuse at a predetermined temperature and said insulator being adapted to retain its integrity as an insulation coating at said temperature.

4. The sleeve as defined in claim 1 wherein all but the first and last of said turns are fused throughout their length to provide an integral sleeve, a portion of said first and last turns remaining unfused and providing electrical leads for connection to an electrical energy source.

5. The sleeve as defined in claim 1 wherein a portion of the first of said turns is crossed over the surface of said sleeve and extends beyond the last of said turns, and wherein the crossed over portion of said first turn is fused to said sleeve surface to form an integral part thereof.

6. The sleeve as defined in claim 1 wherein said sheath is made of a thermoplastic aliphatic hydrocarbon polymer.

7. The sleeve as defined in claim 1 wherein said turns are serially added in a direction parallel to the axis of said sleeve.

8. The sleeve as defined in claim 1 wherein said turns are serially added in a direction normal to the axis of said sleeve.

References Cited

UNITED STATES PATENTS 3,094,452  6/1963  Von Riegen et al. __ 219—544 X

FOREIGN PATENTS 978,106  12/1964  Great Britain.

RICHARD M. WOOD, *Primary Examiner.*

C. L. ALBRITTON, *Assistant Examiner.*